(12) United States Patent
Brakes et al.

(10) Patent No.: US 12,116,123 B2
(45) Date of Patent: Oct. 15, 2024

(54) METHOD OF MANUFACTURING AN AERODYNAMIC STRUCTURE

(71) Applicant: AIRBUS OPERATIONS LIMITED, Bristol (GB)

(72) Inventors: David Brakes, Bristol (GB); Benjamin Bishop, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 520 days.

(21) Appl. No.: 17/296,388

(22) PCT Filed: Nov. 13, 2019

(86) PCT No.: PCT/GB2019/053216
§ 371 (c)(1),
(2) Date: May 24, 2021

(87) PCT Pub. No.: WO2020/120931
PCT Pub. Date: Jun. 18, 2020

(65) Prior Publication Data
US 2022/0266978 A1    Aug. 25, 2022

(30) Foreign Application Priority Data

Dec. 10, 2018    (GB) ...................................... 1820062

(51) Int. Cl.
*B64C 3/26*     (2006.01)
*B64C 3/18*     (2006.01)
*B64F 5/10*     (2017.01)

(52) U.S. Cl.
CPC ................ *B64C 3/26* (2013.01); *B64C 3/185* (2013.01); *B64C 3/187* (2013.01); *B64F 5/10* (2017.01)

(58) Field of Classification Search
CPC ........... B64C 3/26; B64C 3/185; B64C 3/187; B64C 3/22; B64C 3/18; B64C 3/182; B64C 3/20; B64F 5/10
See application file for complete search history.

(56) References Cited

U.S. PATENT DOCUMENTS 1,438,685 A * 12/1922 Belcher .................. B64C 3/185
                                                    244/123.4
1,545,129 A *  7/1925 Cook, Jr. ................. B64C 3/00
                                                    244/123.4
(Continued)

FOREIGN PATENT DOCUMENTS

GB          125092      4/1919
GB          127299      6/1919
(Continued)

OTHER PUBLICATIONS

International Search Report for PCT/GB2019/053216, mailed Feb. 4, 2020, 5 pages.
(Continued)

*Primary Examiner* — Assres H Woldemaryam
(74) *Attorney, Agent, or Firm* — Nixon & Vanderhye P.C.

(57) ABSTRACT

A method of manufacturing an aerodynamic structure, for example, an aircraft wing tip, is disclosed. The method includes providing an upper cover having a plurality of lugs, providing a lower cover having a plurality of lugs, measuring the distance between a lug on the upper cover and corresponding lug on the lower cover, selecting, from the plurality of different sized links, a link suitably sized to correspond to the measured distance between the lug on the upper cover and corresponding lug on the lower cover, connecting the selected link to the lug on the upper cover and corresponding lug on the lower cover; and repeating (Continued)

those steps such that each lug on the upper cover is joined to a corresponding lug on the lower cover.

15 Claims, 9 Drawing Sheets

(56) References Cited

U.S. PATENT DOCUMENTS

| | | | | |
|---|---|---|---|---|
| 1,829,922 | A * | 11/1931 | Carns | B64C 3/00 |
| | | | | 244/123.4 |
| 1,908,757 | A * | 5/1933 | Hathorn | B64C 3/187 |
| | | | | 52/693 |
| 2,382,357 | A * | 8/1945 | Watter | B64C 1/08 |
| | | | | 52/693 |
| 2,791,386 | A * | 5/1957 | Kastan | B64C 3/18 |
| | | | | 52/693 |
| 3,156,440 | A | 11/1964 | Ikeda | |
| 4,776,534 | A * | 10/1988 | Bamford | B64C 3/185 |
| | | | | 52/693 |
| 5,534,354 | A * | 7/1996 | Gregg | B23K 26/28 |
| | | | | 244/123.3 |
| 5,956,251 | A * | 9/1999 | Atkinson | G07C 3/14 |
| | | | | 700/109 |
| 6,428,452 | B1 * | 8/2002 | Dahlstrom | B25J 17/0216 |
| | | | | 483/56 |
| 6,539,571 | B1 * | 4/2003 | Forsyth | E01D 6/00 |
| | | | | 52/693 |
| 6,804,927 | B2 * | 10/2004 | Forsyth | E01D 6/00 |
| | | | | 52/645 |
| 7,597,287 | B2 * | 10/2009 | Gay | B64C 3/18 |
| | | | | 14/4 |
| 9,194,125 | B1 * | 11/2015 | Romanenko | E04C 1/39 |
| 9,216,810 | B2 * | 12/2015 | Cruz Dominguez | B64C 1/061 |
| 9,862,096 | B2 * | 1/2018 | Sivich | B25J 9/1687 |
| 10,399,663 | B2 * | 9/2019 | Soula | B64C 1/06 |
| 10,640,221 | B2 * | 5/2020 | Grip | B64C 3/18 |
| 2018/0267508 | A1 * | 9/2018 | Ferry | G06Q 10/06 |

FOREIGN PATENT DOCUMENTS

| | | |
|---|---|---|
| GB | 147734 | 9/1921 |
| RU | 2 661 661 | 7/2018 |

OTHER PUBLICATIONS

Written Opinion of the ISA for PCT/GB2019/053216, mailed Feb. 4, 2020, 6 pages.
Combined Search and Examination Report for GB1820062.6, dated Jun. 7, 2019, 9 pages.

* cited by examiner

Fig. 10

METHOD OF MANUFACTURING AN AERODYNAMIC STRUCTURE

CROSS REFERENCE TO RELATED APPLICATIONS

The present application is a National Phase of International Application Number PCT/GB2019/053216 filed Nov. 13, 2019, which designated the U.S. and claims priority benefits from Great Britain Application Number GB 1820062.6 filed Dec. 10, 2018, the entire contents of each of which are hereby incorporated by reference.

BACKGROUND OF THE INVENTION

The present invention relates to a method of manufacturing an aerodynamic structure. More particularly, but not exclusively, the invention relates to a method of manufacturing an aircraft wing tip.

Typically, aerodynamic structures, such as aircraft wing tips, are manufactured by placing an upper cover and lower cover in a jig, and joining the upper cover to the lower cover using a series of spars, ribs, etc. In order to provide the required accuracy of construction, it is often necessary to use shims and rejig the structure many times during manufacture. The present invention seeks to provide an improved manufacturing method, whereby the required accuracy of manufacture can be met whilst operating at a relatively high speed of manufacture.

SUMMARY OF THE INVENTION

The present invention provides, according to a first aspect, a method of manufacturing an aircraft wing tip, the method comprising the following steps:
(a) providing an upper cover comprising a plurality of lugs;
(b) providing a lower cover comprising a plurality of lugs;
(c) measuring the distance between a lug on the upper cover and corresponding lug on the lower cover;
(d) selecting, from a plurality of different sized links, a link suitably sized to correspond to the measured distance between the lug on the upper cover and corresponding lug on the lower cover;
(e) connecting the selected link to the lug on the upper cover and corresponding lug on the lower cover; and
(f) repeating steps (c) to (e) such that each lug on the upper cover is joined to a corresponding lug on the lower cover.

The method may comprise the step of providing a plurality of different sized links. The different sized links may comprise different lengths of link.

The method may comprise the step of connecting at least one lug on the upper cover to two corresponding lugs on the lower cover. The method may comprise the step of connecting at least one lug on the lower cover to two corresponding lugs on the upper wing cover.

The lugs on the upper cover and lugs on the lower cover may comprise apertures or holes. The lugs on the upper cover and lugs on the wing cover may face inwards with respect to the wing tip envelope. The lugs on the upper cover and lugs on the lower cover may be spaced apart along the length of the covers. The measurement of the distance between a lug on the upper cover and corresponding lug on a lower cover may comprise measuring the distance between a datum for each lug. The datum may be the centres of the holes in the apertures.

The links may be fixed length links, i.e. the links are not able to change in length once they have been manufactured. The links may comprise an extended centre portion with apertures located at each end of the centre portion. The different sized links may comprise differently spaced apertures. The centre portion may be elongate. The centre portion may extend along the longitudinal direction of the link. The apertures in the links may approximately correspond in size to the apertures in the lugs. The connection of a selected link to a lug on the upper cover and corresponding lug on the lower cover may comprise passing a bolt or other suitable fastener through corresponding apertures of the selected link and respective lugs. A bush may be located within at least the aperture of a lug. The fastener size may be chosen such that the positional tolerances between the aperture of a lug and the corresponding aperture of a link is less than the clearance between the fastener and the two apertures. This ensures that all fasteners will fit when offered up for assembly. The links have the advantage of having only one tolerance that adds to the system tolerances.

Due to manufacturing tolerances, the distance between the centres of the apertures in the lugs may vary. The provision of a selection of different sized links allows for the slight variation in distances to be compensated for, without requiring significant rejigging or re-engineering of the wing tip. The selection of different sized links are preferably chosen to provide a selection of links sized to cover the maximum possible distance between the lugs and the minimum possible distance between the lugs. Such a range may be decided by addition of the various tolerances in the system to provide an overall system tolerance. The selection of different sized links may comprise a selection of different length links, with the distance between the apertures selected to fully cover the range from the maximum to minimum possible distance between lugs. The manufacturing tolerance from one link to the next sized link may be such that distance between apertures is consecutive or overlapping. I.e. the variation in distance between apertures in one size of link may be such that maximum distance between apertures in that size of link runs up to, or overlaps, the minimum distance between apertures in the next size of link. Alternatively or additionally, there may be a level of float allowed when the links are installed, which allows a seamless/continuous coverage of the link lengths required.

The appropriate selection of different sizes of link may allow the manufacturing process to continue uninterrupted, with the resultant increase in manufacturing speed and efficiency. The method may comprise the step of performing a statistical analysis of the measured distance between lugs to ensure the provision of a suitable number of different sized links. For example, the average distance measured between lugs may result in a greater number of links sized to correspond to that distance, than the number of links sized to correspond with the minimum and maximum distance measured between the lugs.

The step of measuring the distance between a lug on the upper cover and corresponding lug on the lower cover may comprise use of an electronic, for example optical, measuring apparatus. The electronic measuring apparatus may automatically measure the distance between a lug on the upper cover and corresponding lug on the lower cover. The step of selecting, from the plurality of different sized links, a link suitably sized to correspond to the measured distance between the lug on the upper cover and corresponding lug on the lower cover, may comprise use of an electronic selection apparatus. For example, the step may comprise use of a computer processor, the computer processor arranged to receive the measurement data from an electronic measurement apparatus and configured to automatically select the appropriate sized link from the plurality of different sized links. The computer processor may be configured to send selection instructions to machine assembly apparatus. The step of connecting the selected link to the lug on the upper cover and corresponding lug on the lower cover may be undertaken by a machine assembly apparatus. In such an arrangement of the system, the measurement step, the selection step, and connecting step may all be carried out automatically, and/or without input from an engineer.

In an alternative arrangement, the step of measuring the distance between a lug on the upper cover and corresponding lug on the lower cover may comprise a human operator/engineer measuring the distance using one or more measurement apparatus. For example, the operator may have access to a number of measurement tools which correspond in size to the plurality of different sized links, and the operator may compare or insert those measurement tools into the appropriate lugs in order to complete the measurement step. The step of selecting, from the plurality of different sized links, a link suitably sized to correspond to the measured distance between the lug on the upper cover and corresponding lug on the lower cover, may comprise an operator making a selection from the plurality of links based on their measurement results. The step of connecting the selected link to the lug on the upper cover and corresponding lug on the lower cover may be undertaken by an operator following the selection of the appropriate link. In such an arrangement of the system, the measurement step, the selection step, and connecting step may all be carried out by a human operator/engineer in a simple and straightforward manner.

The lugs may be joined by pair of links selected from the plurality of different sized links, with a link located to each side of the lugs. Where a lug extending from the upper cover is connected to two lugs on the lower cover, there may be up to four links joined to the lug, usually with two links provided to each side of the lug. The pairs of links, once chosen, may be temporarily fastened to each other using a clip to ease installation of the links.

The links and the lugs may form a spar. Such an arrangement may be advantageous in an aircraft wing tip, where the wing tip is not required to carry fuel. In such a scenario, there is no need for the spar to be hermetically sealed. The invention may also be applicable to scenarios in which the wing tip is required to store fuel, and in such a scenario, a bladder or other sealed arrangement to contain the fuel may be provided. The skilled person will appreciate that the links and the lugs may form alternative structural elements of an aircraft wing tip, for example a rib.

The wing tip may be a wing tip device, movable between a flight configuration and ground configuration. In the ground configuration, the span of the wing to which the wing tip device is attached may be reduced. Such an arrangement may be advantageous when looking to provide longer wing span aircraft whilst still being able to operate those aircraft using existing airport infrastructure, for example maximum gate wing spans.

The wing tip may comprise a plurality of sections. Each of the sections may have a corresponding set of links. For example, if the wing tip comprises two sections, the first section may be spaced such that the expected distance between lugs is X, and the second section may be spaced such that the expected distance between lugs is Y. X may be greater than Y. The first set of links may comprise a plurality of links sized from X to X± system tolerance, and the second set of links may comprise a plurality of links sized from Y to ± system tolerance.

The spar assembly may be located in the vicinity of the tip of the wing. For example the spar assembly may extend within at least the outer 10%, or 20%, or 30%, of the span of the wing.

According to another aspect of the invention, there may be provided an aircraft wing tip manufactured according to the method of the first aspect of the invention.

According to a yet further aspect of the invention, there is provided an aircraft comprising a wing tip manufactured according to the method of the first aspect of the invention.

According to another aspect of the invention, there may be provided a spar, the spar comprising a series of connected lugs and links, manufactured according to the method as described with reference to the first aspect of the invention.

It has been recognised that aspects of the invention may also be applicable to other aerodynamic structures on the aircraft. Thus, according to a further aspect of the invention, there is provided a method of manufacturing an aerodynamic structure, the method substantially as described with reference to the first aspect of the invention. The aerodynamic structure may be part of the empennage. The aerodynamic structure may be, or function as, a rudder. The aerodynamic structure may be, or function as, an elevator. The aerodynamic structure may be a wing.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

According to an aspect of the invention there is provided a method of selecting a plurality of links to be used in a wing tip manufacturing process, the method including the following steps:
(a) locating an upper cover opposite a lower cover, the upper cover comprising a plurality of lugs facing the lower cover, and the lower cover comprising a plurality of lugs facing the upper cover, such that corresponding pairs of an upper cover lug and lower cover lug are spaced approximately a set distance from each other;
(b) for each pair of upper cover lug and lower cover lug measuring the distance from a datum on the upper cover lug and datum on the lower cover lug,
(c) calculating the variation in the measured distance between corresponding pairs of an upper cover lug and lower cover lug, thereby resulting in a maximum and minimum distance; and
(d) selecting a plurality of different sized links ranging from the maximum distance to minimum distance.

The selection of a plurality of different sized links may comprise determining an increment step, by which a link increases in size from one size to the next, and providing the selection of links such that a range of links is provided with consecutive sizing from the maximum distance to the minimum distance. The increment step may be chosen with reference to the manufacturing tolerances of the links, such that a smooth and continuous range is provided from the minimum distance to the maximum distance. By way of example, the nominal set distance between lugs may be 113.0 mm. The maximum measured distance between links may be 113.4 mm and the minimum measured distance 112.6 mm. The manufacturing tolerance and/or the float allowed when installing each link may be ±0.1 mm. Therefore, a series of five different sized links may be provided to ensure a continuous coverage of link length from the minimum set distance to maximum distance. The nominal set distance link forms the centre of the range, and has a length of L=113.0 mm±0.1 mm. For the first undersize link L=112.8 mm±0.1 mm. The second undersize link has L=112.6 mm±0.1 mm. The first oversize link L=113.2 mm±0.1 mm. The second oversize link has L=113.4 mm±0.1 mm. Therefore, it can be seen that the range of links provided will be suitable for joining any of the pairs of upper cover lugs and lower cover lugs, regardless of the measured distance between the lugs.

According to a further aspect of the invention, there is provided a method of selecting a plurality of links to be used in a wing tip manufacturing process, the method including the following steps:
(a) manufacturing an upper cover comprising a plurality of lugs and a lower cover comprising a plurality of lugs;
(b) determining the manufacturing tolerances during the manufacture of the lugs;
(c) locating the upper cover opposite to the lower cover;
(d) determining the positional tolerances of the lugs;
(e) adding the manufacturing tolerances and positional tolerances to determine the overall system tolerance;
(f) determining a range of different sized links, comprising a link of a nominal length which may be used to join an upper cover lug to a lower cover lug, and one or more lugs with a greater length than the nominal length and one or more lugs with a smaller length than the nominal length, such that the links of greatest and smallest length are equal to the nominal length plus or minus the system tolerance.

For example, if each lug comprises an aperture, and the aperture is manufactured with a tolerance of ±0.1 mm, and when the lugs are placed opposite each other there is a positional tolerance of ±0.3 mm, then the stacked tolerance of the system will be ±0.5 mm (0.1 mm+0.1 mm+0.3 mm). Therefore, the range of links must extend from L(nominal) to L(nominal)±0.5 mm.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
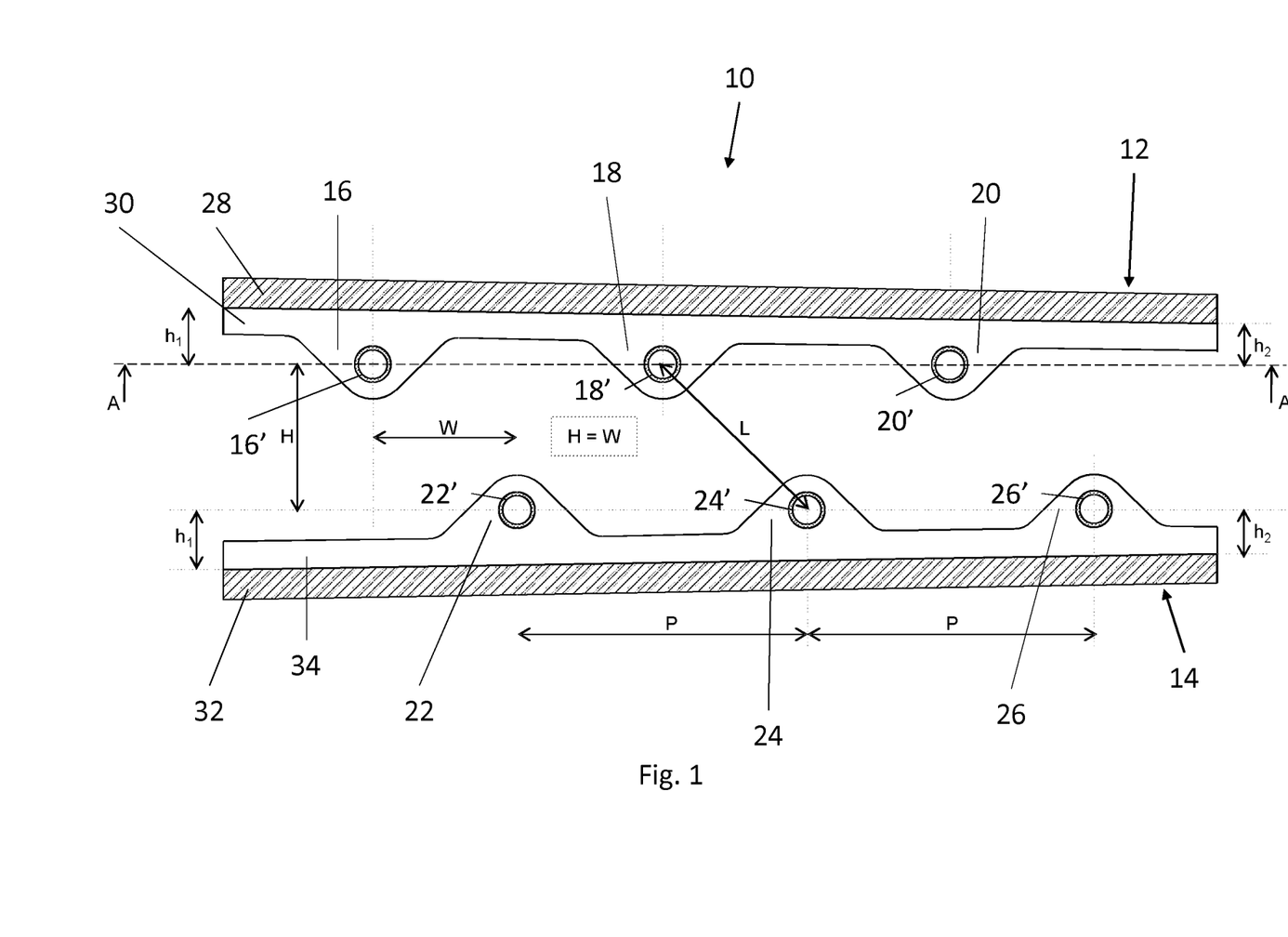
FIG. 1 shows a cross-sectional view of a wing tip during a stage of manufacture.
Figure 2:
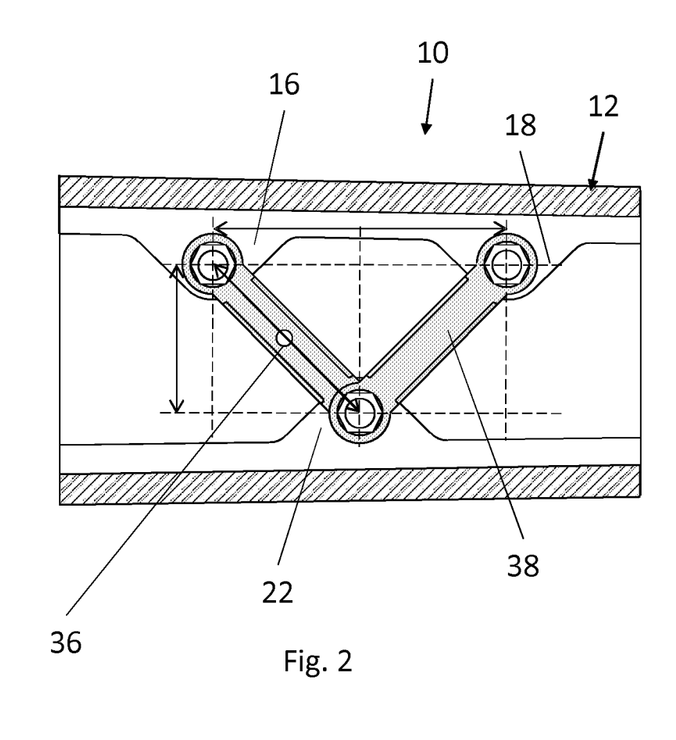
FIG. 2 shows a cross-sectional view of part of the wing tip shown in FIG. 1, at a further stage of manufacture.

FIG. 1 shows a section of a wing tip 10 according to a first aspect of the invention. The wing tip 10 comprises an upper cover 12 and a lower cover 14. The upper cover comprises an aerodynamic surface 28, for example a wing skin, and structural component 30. The structural component 30 comprises a plurality of lugs 16, 18, and 20, each lug comprising an aperture 16', 18', 20'. The lower cover 14 comprises an aerodynamic surface 32 and a structural component 34. The structural component 34 comprises a plurality of lugs 22, 24, 26, each lug comprising an aperture 22', 24', 26'. As can be seen in FIG. 1, the upper cover lugs 16, 18, 20, are offset from the lower cover lugs 22, 24, 26. As also illustrated in FIG. 1, the vertical (measured in a local direction) displacement H of the upper cover lug apertures 16', 18', 20', relative to the lower cover lug apertures 22', 24', 26', is approximately the same for each of the upper cover lug apertures. Additionally, the horizontal (measured locally) displacement W of the upper cover lug apertures 16', 18', 20', relative to the lower cover lug apertures 22', 24', 26', is approximately the same for each of the upper cover lug apertures 16', 18', 20'. The dimensions H and W are indicated with arrows on FIG. 1, and the skilled person will appreciate that the references to the vertical and horizontal being measured locally encompasses the directions indicated by the respective arrows. As can be seen in FIG. 1, there is a centreline A-A passing through the centres of each of the upper cover apertures 16', 18', 20', and the vertical displacement of the centres of each of the apertures relative to the upper aerodynamic surface 28 reduces from h1 to h2 as the wing tip device extends horizontally. This allows vertical displacement between respective apertures (for example, 16' and 22') to remain constant, whilst still allowing the vertical height of the wing tip 10 to taper. A mirrored arrangement can be found with reference to the lower cover apertures 22', 24', 26'. Also indicated on FIG. 1 is the actual distance L between the centres of the corresponding apertures, 18' and 24'. The corresponding apertures are joined together by links, as shown in FIG. 2. A first link 36 joins the aperture 16' to the aperture 22'. A second link 38 joins the aperture 22' to the aperture 18'. The installation of links is repeated all along the wing tip 10, such that the plurality of links join all of the corresponding apertures, and a spar structure is created.

Figure 3:
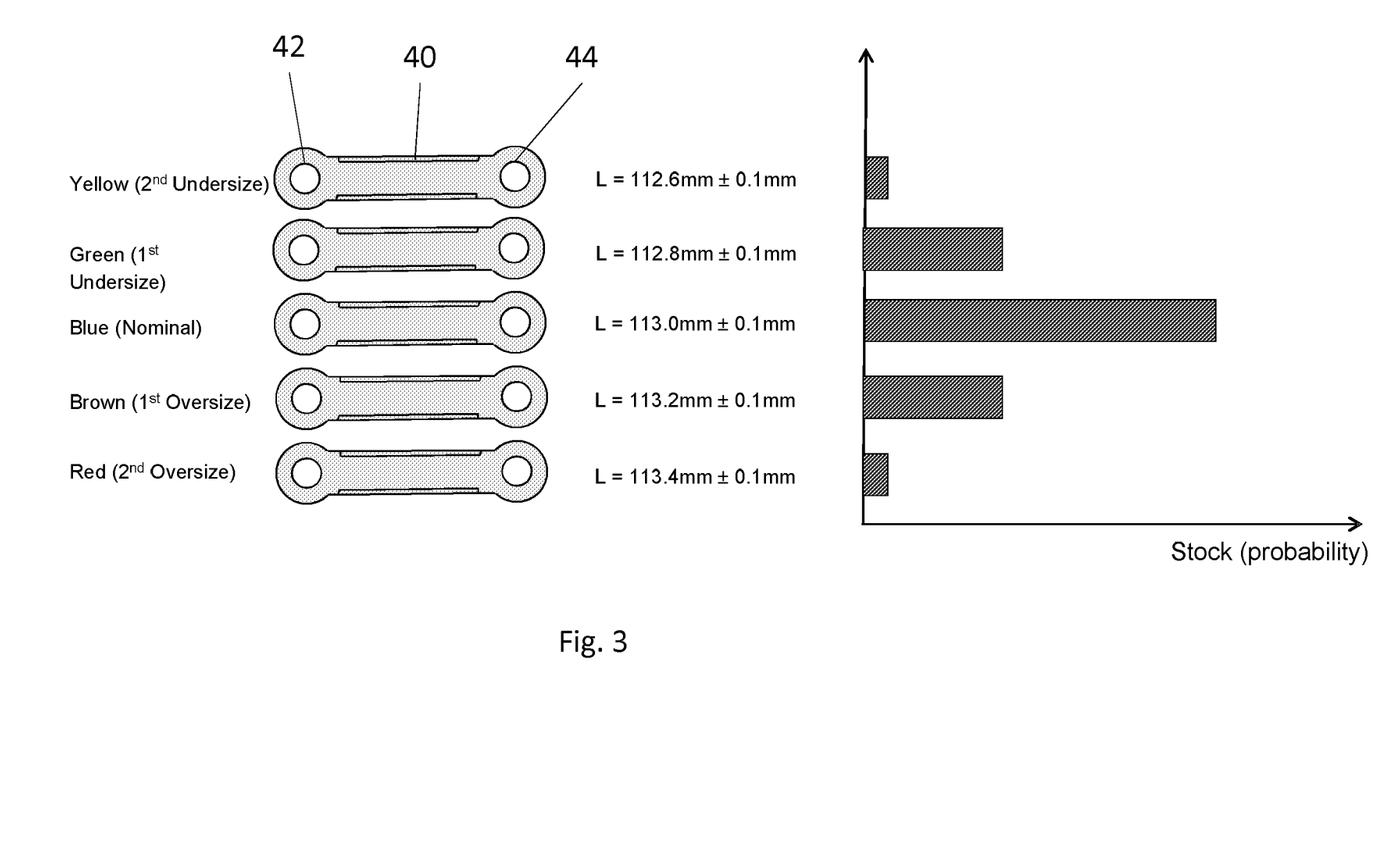
FIG. 3 shows a selection of links of different sizes, and a statistical distribution of the stock requirements.

FIG. 3 shows a selection of links 40 which may be selected for joining together the upper cover 12 and lower cover 14. A nominal size link is provided (L=113.0 mm±0.1 mm), with two further links of shorter length (L=112.8±0.1 mm and L=112.6 mm±0.1 mm), and two further links of longer length (L=113.2 mm±0.1 mm and L=113.4 mm±0.1 mm). The length in question is the distance between the centre points of the apertures 42 and 44 located to each end of the link 40, and the range of sizes is chosen to cover the maximum and minimum possible length required, based on the system tolerances. In this scenario, the maximum length link required is 113.4 mm and the minimum length link required is 112.6 mm. Providing links with a 0.2 mm increment, and a ±0.1 mm tolerance or float when fitting, ensures that any distance L may be covered by the range of links. In order to help identify the different sized links, the links may be colour coded. FIG. 3 also shows a graph of the predicted stock requirement for each size of link, with the nominal length link being most frequently used, and the longest and shortest links being least frequently used. The range of links provided may be chosen based on an analysis of the measurement results, or by adding the tolerances of the system prior to undertaking the measurement step.

Figure 4:
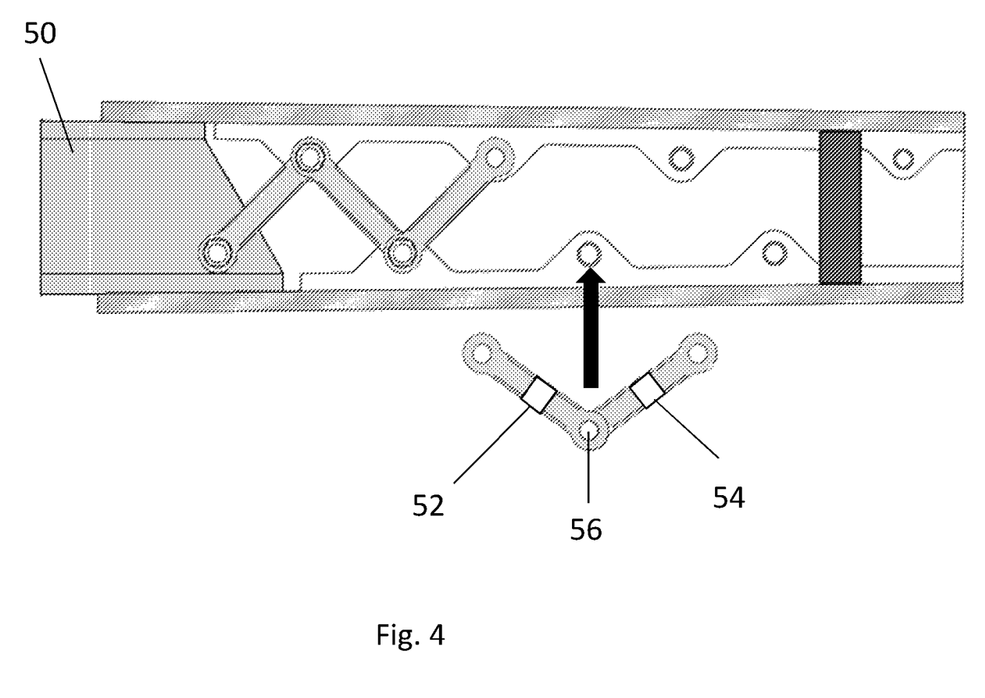
FIG. 4 shows a cross-sectional view of a wing tip connected to a wing root section.

FIG. 4 shows the wing tip device 10 as connected to a root spar 50, the root spar 50 extending from the distal end of a wing tip.

In FIGS. 1 to 4, showing a cross-sectional view of the wing tip construction, we have shown and discussed installing links on one side of the plurality of lugs. However, the skilled person will appreciate that it may be mechanically advantageous to supply and install links in pairs, to either side of each of the lugs. In such an arrangement, the pairs of links may be preassembled with clips 52, 54, and slave bolts 56, to help speed up the manufacturing process.

Figure 5:
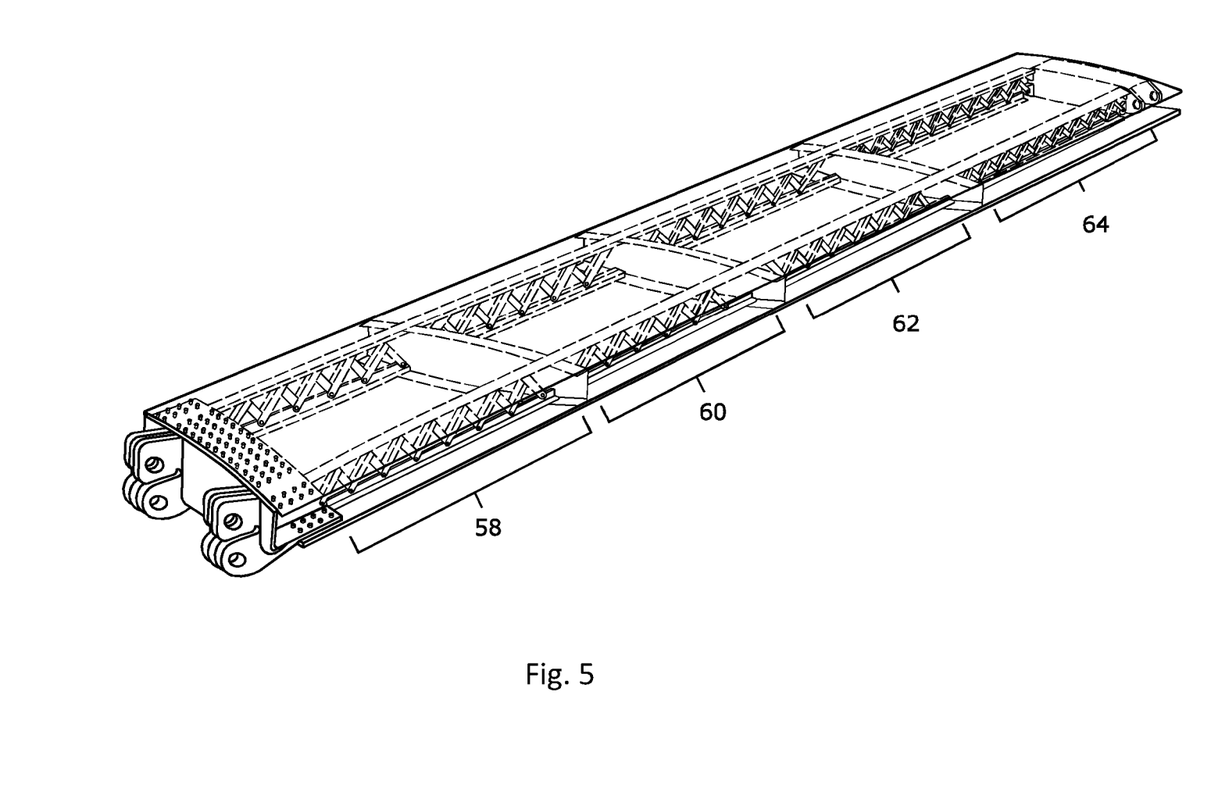
FIG. 5 shows a schematic view of a wing tip device comprising a plurality of different sections.

FIG. 5 shows a wing tip 10 comprising a plurality of sections 58, 60, 62, 64. As the wing tip tapers towards the distal end, the vertical separation of the lugs on the upper cover and lower cover is reduced. Therefore, to maximise efficiency, the wing tip is divided into sections as shown, where for each section there is a correspondingly chosen plurality of different sized links for use in the manufacturing process. By dividing the wing tip into sections rather than having individual lengths of link required all the way along the wing tip, the range of links provided may be reduced, and the efficiency of manufacture improved.

Figure 6:
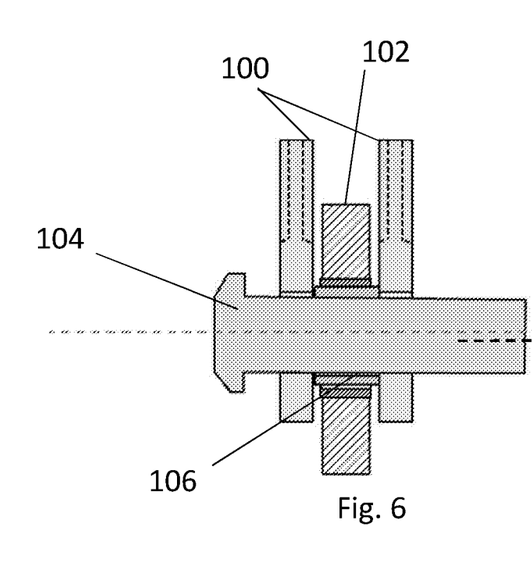
FIGS. 6 and 7 show a cross-sectional view of a fastening arrangement, with various tolerances and the resultant float indicated.
Figure 7:
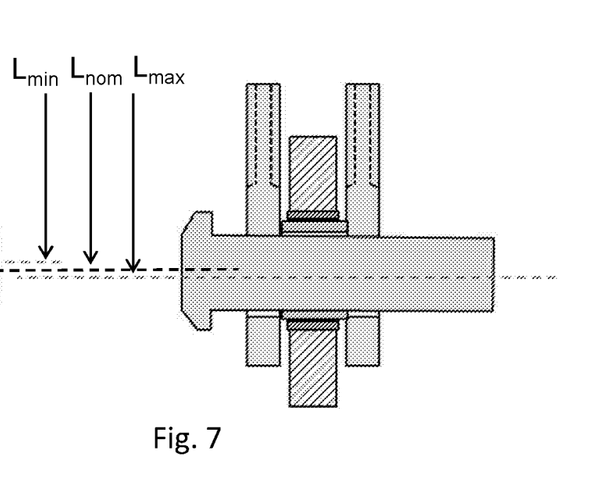
Figure 8:
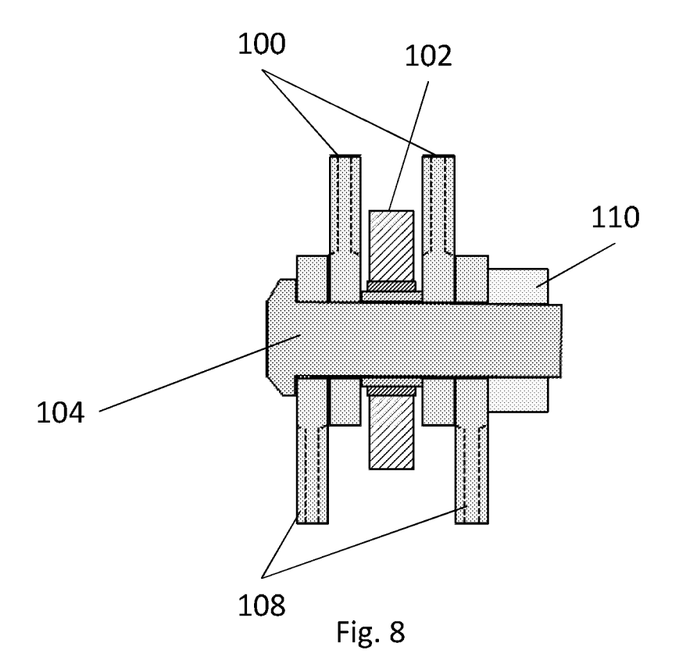
FIG. 8 shows a cross-sectional view of a lug connected with four links.

FIGS. 6 and 7 show how a pair of links 100 may be joined to a lug 102, via a bolt 104 which extends through apertures on each of the links 100 and the lug 102. A bush 106 extends through the aperture in the lug 102 and provides a bearing surface for the bolt 104. Each of the apertures may be manufactured within a certain tolerance, and in FIGS. 6 and 7 the effect that variation in tolerance has on the measured length L is indicated. When the tolerance is zero, and the apertures all line up exactly, the measured length is the nominal length L(nom). The tolerances may combine to give the shortest measured length L(min) or the longest measured length L(max). The differences between the L(min), L(max) and L(nom) indicate the range across which different sized links must be provided in order to ensure that an appropriately sized link is available. FIG. 8 shows how two pairs of links 100, 108 are joined to each aperture 102, and how the bolt 104 may engage with a nut 110 to hold the pairs of links 100, 108 in place.

Figure 9:
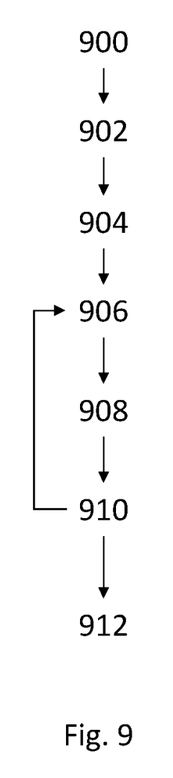
FIG. 9 is a flow chart detailing the method of manufacture according to the invention.

FIG. 9 shows a flow chart detailing a method of manufacture according to an aspect of the invention. In step 900, a lower wing cover 14 is provided. The lower wing cover comprises a plurality of lugs 22, 24, 26. In step 902, an upper wing cover 12 is provided. The upper wing cover comprising a plurality of lugs 16, 18, 20. In step 904, the upper wing cover 12 and lower wing cover 14 are held in position relative to each other, usually in a jig. The upper cover and lower cover may be joined by ribs prior to installation of the links. In step 906 the distance between corresponding lug apertures is measured. This may be done automatically and electronically, for example using photogrammetry equipment, or manually using mechanical measuring apparatus. In step 908, based on the measured distance between the corresponding apertures, a selection of an appropriately sized link is made from a plurality of different sized links. As with the measuring step, this may be done automatically or manually. In step 910 the chosen links are installed, connecting the respective apertures to one another. The method steps 906, 908, 910, are repeated until all of the apertures are connected up as required, as indicated by step 912.

Figure 10:
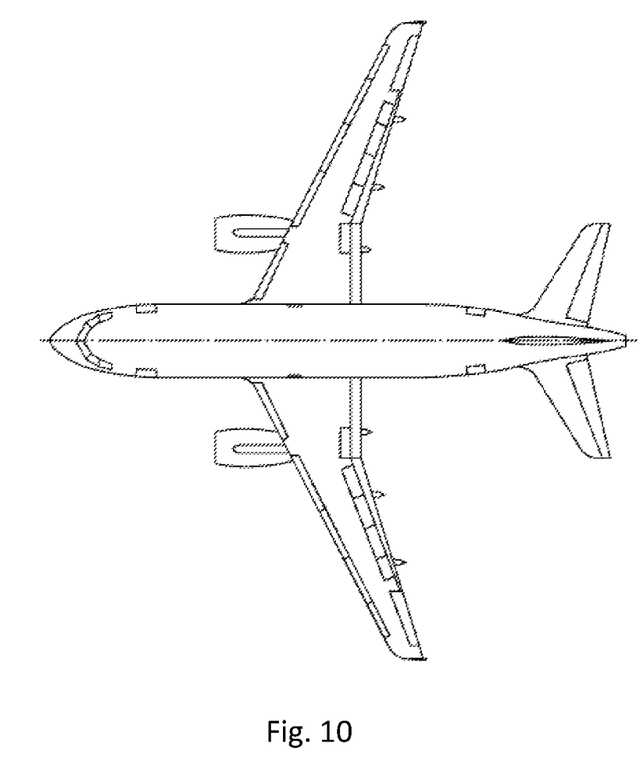
FIG. 10 shows an aircraft comprising a wing tip according to an aspect of the invention.

FIG. 10 shows an aircraft comprising a wing tip manufactured according to the method as described with reference to FIG. 9.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of manufacturing an aircraft wing tip, the method comprising the following steps:
   (a) providing an upper cover comprising a plurality of lugs;
   (b) providing a lower cover comprising a plurality of lugs;
   (c) measuring the distance between a lug on the upper cover and corresponding lug on the lower cover with an optical measuring apparatus;
   (d) selecting, from a plurality of different sized links, a link suitably sized to correspond to the measured distance between the lug on the upper cover and corresponding lug on the lower cover with an electronic selection apparatus;
   (e) connecting the selected link to the lug on the upper cover and corresponding lug on the lower cover with a machine assembly apparatus, wherein at least one lug on the upper cover is connected to two corresponding lugs on the lower cover, wherein at least one lug on the lower cover is connected to two corresponding lugs on the upper wing cover, and wherein the pairs of the links are preassembled with clips and slave bolts; and
   (f) repeating steps (c) to (e) such that each lug on the upper cover is joined to a corresponding lug on the lower cover.

2. The method as claimed in claim 1, further comprising the step of providing a plurality of different sized links.

3. The method as claimed in claim 1, wherein the lugs on the upper cover and lugs on the lower cover comprise apertures and the measurement of the distance between a lug on the upper cover and corresponding lug on a lower cover comprises measuring the distance between a datum for each lug.

4. The method as claimed in claim 3, wherein the datum is the centres of the holes in the apertures.

5. The method as claimed in claim 3, wherein the connection of a selected link to a lug on the upper cover and corresponding lug on the lower cover comprises passing a bolt through corresponding apertures of the selected link and respective lugs.

6. The method as claimed in claim 1, further comprising the step of performing a statistical analysis of the measured distance between lugs to ensure the provision of a suitable number of different sized links.

7. The method as claimed in claim 1, wherein the step of connecting the selected link to the lug on the upper cover and corresponding lug on the lower cover is undertaken by a machine assembly apparatus.

8. The method as claimed in claim 1, wherein the step of measuring the distance between a lug on the upper cover and corresponding lug on the lower cover comprises a human operator/engineer measuring the distance using one or more measurement apparatus.

9. The method as claimed in claim 1, wherein the step of connecting the selected link to the lug on the upper cover and corresponding lug on the lower cover is undertaken by an operator following the selection of the appropriate link.

10. The method as claimed in claim 1, wherein the links and the lugs form a spar.

11. The method as claimed in claim 1, wherein the wing tip comprises a plurality of sections, and for each section there is provided a corresponding set of links.

12. A wing tip manufactured according to the method of claim 1.

13. An aircraft comprising a wing tip manufactured according to the method of claim 1.

14. The method as claimed in claim 1, wherein the steps (c), (d), (e), and (f) are performed consecutively in that order.

15. The method as claimed in claim 1, wherein the selection comprises an increment step by which a link increases in size from one size to the next.

* * * * *